United States Patent
Kamboh et al.

(10) Patent No.: US 8,443,087 B2
(45) Date of Patent: May 14, 2013

(54) SYSTEM FOR MANAGING SESSIONS AND CONNECTIONS IN A NETWORK

(75) Inventors: Ameel Kamboh, Billerica, MA (US); Lava Lavu, North Billerica, MA (US); Stewart Hodde Maxwell, Dallas, TX (US)

(73) Assignee: Rockstar Consortium US LP, Plano, TX (US)

( * ) Notice: Subject to any disclaimer, the term of this patent is extended or adjusted under 35 U.S.C. 154(b) by 1541 days.

(21) Appl. No.: 10/961,630

(22) Filed: Oct. 8, 2004

(65) Prior Publication Data

US 2005/0091388 A1   Apr. 28, 2005

Related U.S. Application Data

(60) Provisional application No. 60/509,951, filed on Oct. 9, 2003, provisional application No. 60/511,981, filed on Oct. 16, 2003.

(51) Int. Cl.
*G06F 15/16* (2006.01)
*H04J 3/16* (2006.01)

(52) U.S. Cl.
USPC .......................... 709/227; 709/228; 370/466

(58) Field of Classification Search .................. 709/227, 709/228; 370/466
See application file for complete search history.

(56) References Cited

U.S. PATENT DOCUMENTS

| | | | |
|---|---|---|---|
| 6,446,109 B2 * | 9/2002 | Gupta | 709/203 |
| 6,748,439 B1 * | 6/2004 | Monachello et al. | 709/229 |
| 7,058,031 B2 * | 6/2006 | Bender et al. | 370/329 |
| 7,613,993 B1 * | 11/2009 | Baer et al. | 715/205 |
| 2003/0026525 A1 * | 2/2003 | Alvarez | 385/16 |
| 2003/0149894 A1 * | 8/2003 | Bellinger et al. | 713/201 |
| 2003/0187978 A1 * | 10/2003 | Nakamura et al. | 709/224 |
| 2004/0059735 A1 * | 3/2004 | Gold et al. | 707/100 |
| 2004/0131078 A1 * | 7/2004 | Gupta et al. | 370/466 |
| 2005/0038801 A1 * | 2/2005 | Colrain et al. | 707/100 |

OTHER PUBLICATIONS

Maffeis, S.; , "A fault-tolerant CORBA name server," Reliable Distributed Systems, 1996. Proceedings., 15th Symposium on , vol., no., pp. 188-197, Oct. 23-25, 1996.*
Felber, P.; Guerraoui, R.; Schiper, A.; , "Replicating objects using the CORBA Event Service?," Distributed Computing Systems, 1997., Proceedings of the Sixth IEEE Computer Society Workshop on Future Trends of , vol., no., pp. 14-19, Oct. 29-31, 1997.*
Georgiev, V.; Getov, V.; , "Assignment schemes for replicated services in Jini," Parallel, Distributed and Network-based Processing, 2002. Proceedings. 10th Euromicro Workshop on , vol., no., pp. 129-136, 2002.*

* cited by examiner

*Primary Examiner* — Lynn Feild
*Assistant Examiner* — Taylor Elfervig
(74) *Attorney, Agent, or Firm* — Withrow & Terranova, PLLC

(57) ABSTRACT

A modular architecture for use in a network device such as a Remote Authentication Server (RAS) includes a number of interconnected objects associated with processes, services, access protocols and other functionality provided on the device. Objects may also be associated with users, sessions or other data structures that may be accessed by any of the functional objects in the device. Additional services and updates may easily be implemented into this architecture without disrupting user connections. Redundant copies of the objects may be maintained in memory to facilitate the provision of carrier grade performance by swapping out failed components in the event of a fault.

5 Claims, 15 Drawing Sheets

US 8,443,087 B2

SYSTEM FOR MANAGING SESSIONS AND CONNECTIONS IN A NETWORK

RELATED APPLICATIONS

This application claims priority under 35 U.S.C. §1.119(e) to previously filed provisional applications, Ser. Nos. 60/509,951 and 60/511,981 filed respectively on Oct. 9, 2003 and Oct. 16, 2003.

FIELD OF THE INVENTION

This invention relates generally to the field of networking and more specifically to a method and apparatus for managing connections to a network.

BACKGROUND OF THE INVENTION

As it is known art, Broad-band Remote Authentication Services (BRAS) are used to control access by external users to the systems and services of a network. Before a user is permitted to access a resource provided in the network, the RAS authenticates the user and establishes connections between the user and any authorized resources. The RAS may also include accounting functionality for monitoring the service level realized at a given user connection. A user connection may terminate at the RAS or be further forwarded to another device in the network.

RAS systems need to be capable of supporting multiple types of user environments because groups of user connections may utilize different security, routing, service level and other protocols. Generally a RAS system is initialized with a base group of functions (services and protocols) that are expected to support a given network environment. Should a user connection require a service or connection protocol that is unsupported in the base set of protocols the service or protocol is added to the service set of the RAS, and the device is re-booted. One problem with this method is that the reboot operation undesirably disrupts existing user connections. The disruption makes it undesirable to remove functionality in the RAS operating system when user connections no longer require the functionality. Thus, as user connections are added and deleted, the number of protocols and services supported by the operating system increases. Unused functionality undesirably utilizes resources which could otherwise be allocated to required functionality, thereby reducing system performance.

SUMMARY OF THE INVENTION

According to one aspect of the invention, a Connection Manager (CM) modular architecture is provided for use in a Remote Access Service provider (RAS) environment. The architecture apportions different resources of the CM into components (also referred to interchangeably as objects or modules) that are selectively accessed by the operating system depending upon the needs of the particular user environment. The resources that are represented as objects include functional processes and applications as well as session and user records. Thus the architecture of the CM is scalable, allowing for addition or deletion of users, sessions and application functionality without the need to disrupt existing user connections.

According to another aspect of the invention, a connection manager for use on a device comprises a plurality of service objects associated with services provided at the device; and a data object representing a user connection at the device, the data object identifying at least one service object that is associated with the user connection.

According to another aspect of the invention, a connection manager operating at a device includes means for associating a plurality of services available at the device with a corresponding plurality of service objects, means for receiving a request from a user for a connection to the device; and means, in response to the request, for generating a data object associated with the connection, the data object identifying at least one service object corresponding to a service associated with the connection.

According to a further aspect of the invention, a method for controlling connections at a device includes the steps of associating a plurality of services available at the device with a corresponding plurality of service objects, receiving a request from a user for a connection to the device, and in response to the request, generating a data object associated with the connection, the data object identifying at least one service object corresponding to a service associated with the connection.

According to one aspect of the invention, a connection management architecture includes a user record data structure which controls the configuration of and provision of services to a user connection. The user record may either be statically provisioned or generated from a template. The contents of the user record are used control the authentication, address generation, tunneling, accounting and IP service provisioning on the user connection for a given domain. Different domains in each user record may have different properties associated with user connections in the domains. With such an arrangement, policies may be attached to any interface, session, subscriber or application flow.

According to one aspect of the invention, carrier grade functionality may be provided in a Remote Authentication Server (RAS) device having a plurality of component objects representing functions of the RAS in the following manner. As each functional component is generated at the RAS, a spare copy of the component is stored in non-volatile memory. As components are swapped into and out of the system, copy of spare components is similarly updated to represent a current snapshot of the operative components and state in the RAS system. In the event of a failure of one of the components, the spared component corresponding to the failed component can be placed into service. User records are read from the fixed storage and the user record database associated with the transitioned component are rebuilt. Any requests for the component are buffered during the rebuild, and thus existing users are unaffected by the failover to the spare component. With such an arrangement, seamless failover of the RAS is achieved, thereby providing a system able to operate in a carrier grade environment. Seamless migration of new applications is also easily supported by this mechanism without affecting user connections.

DETAILED DESCRIPTION

Figure 1:
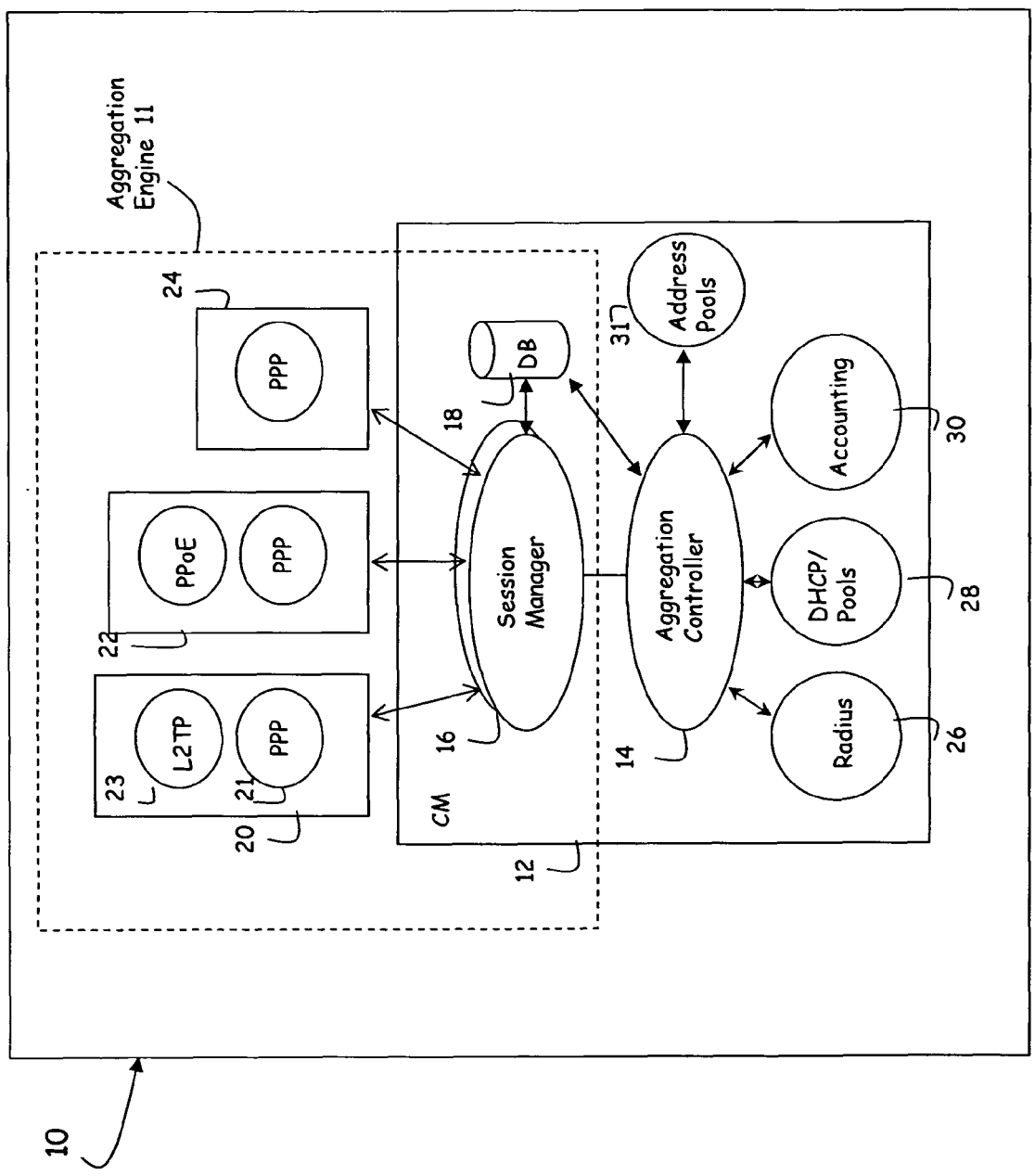
FIG. 1 is a block diagram illustrating several modular components that may form a base set of functionality for a device according to the invention.

Referring now to FIG. 1, a modular architecture for use in a network device such as a Remote Authentication Server (RAS) includes a number of interconnected components (referred to interchangeably as 'objects' or 'modules'). For the purposes of this application a component or object is a self-contained entity that consists of either or both data and procedures to manipulate the data. Thus components may be associated with processes, services, access protocols and other functionality performed on the device. Components may also be associated with users, sessions or other data structures that may be accessed by any of the functional components in the device. In one exemplary embodiment, the components may be represented as objects, stored in a content addressable memory and manipulated using known object-oriented programming techniques.

The use of components to represent functions and state provides an architecture that is modular in nature, with the aggregation of components representing the processing capabilities and operating state of the device. The modular nature of the connection architecture facilitates the addition and deletion of processes, services and applications from a base set of functionality provided at the device, thereby enabling a system manager to tailor the offerings of the device to the particular needs of the user environment.

The logical grouping of the components in device 10 is illustrated in FIG. 1. Within the device, user connections are established when a user requests one or more connections with the device 10. Protocol modules 20, 22 and 24 are components which are used to connect end user devices having different operating protocols to a session manager 16, and thereby access connection resources. The connection requests may be made using any one of a variety of access protocols. For example, one such protocol is the Point-to-Point (PPP) protocol, which is a method of connecting a computer to the Internet using Transmission Control Protocol/Internet Protocol (TCP/IP) packets to a server that puts them onto the Internet. Other protocols that may be used to establish connection with the device include PPP over Ethernet (PPPoE), or Layer2 Tunneling Protocol (L2TP). As part of a user registration process with an Operations Administrative and Maintenance (OAM) logic coupled to the device (not shown), the user specifies one or more access protocols that it will be used at the interface for connection establishment. The OAM forwards requested access protocol interface objects (such as PPP object 21) to the respective protocol object. The protocol object is used to translate access protocol requests in an expected format used for access requests at a Connection Manager (CM) 12, thereby making the access protocols essentially 'plug-and-play' at the CM. As will be described in more detail below, the connection protocol modules may be dynamically generated and added to the available connection protocol set of the RAS as users with different connection needs seek access to the RAS. It should be understood that although several access protocols are shown in the Figure, the present invention is not limited to the use of any particular access protocol. Rather, the present invention permits interconnection of a user under any access protocol through the establishment of the appropriate access protocol interface object.

Also included in the device is a Connection Manager (CM) 12. The Connection Manager 12 in one embodiment is a process which aggregates users connections, established via a variety of protocols, with a set of available connection services. The services provided by the CM may be used both for connections that terminate at the device as well as for connections that are further tunneled. As will be described in more detail below, the Connection Manager may include one or more Session Managers (SM) who are controlled by an Aggregation Engine (AE), and who share access to a common database.

The CM is shown to include a number of components including one or more session manager components 16 and an Authorization, Authentication and Accounting (AAA) component 14. According to one aspect of the invention, each service or protocol that is available for use at the device is componentized and represented as an object. Services may be added or deleted to the service set available at the CM by merely adding or deleting a link service modules. Such an arrangement enables system modifications without the need to undesirably terminate user connections. Thus, applications can plug and play by connecting the applications to the individual session managers, for example using asynchronous 'mev' object messaging. Users are configured directly to the session manager, and the database is centrally managed by the SM. As more applications or connections are desired, the architecture provides a method of quickly integrating more session managers to handle the increased load.

For example, in FIG. 1 one service object module that is coupled to the session manager is an AAA 14, which is an authentication, authorization and accounting system used to control user access to available resources and to keep track of the activity of users over a network. The use of an AAA object abstracts the access protocols from the application. Various protocols and services may exist to support one or more of the AAA functions, and clients associated with the services may be linked to the AAA object. For example, all three services are supported in a RADIUS (Remote Authentication Dial-In-User Service), and thus RADIUS is a service object 26 that is available for use by the AAA 14. FIG. 1 also illustrates a Dynamic Host Control Protocol (DHCP) service 28 and address pool 31, both of which may be used for IP address generation. An Accounting service 30 is also coupled to the AAA 14. It should be noted that although certain services are shown in FIG. 1, the present invention is not limited to any particular service but may be any function that would be performed at the device, including routing protocol service objects for handling different routing at each of the device interface, traffic management service objects, etc.

The session manager 16 will be described in more detail below, but in general controls the creation and deletion of user connections (or sessions) at the device, in addition to maintaining several databases associated with the connection's authorization and status. The session manager 16 is shown coupled to a database 18. In one embodiment the database 18 includes a volatile portion that is used for temporary storage of user and process state. As will be described later herein, in an alternative embodiment, the database 18 includes at least a portion of non-volatile storage that is used for storing redundant copies of each component in the CM to ensure that carrier grade performance may be maintained.

Figure 2:
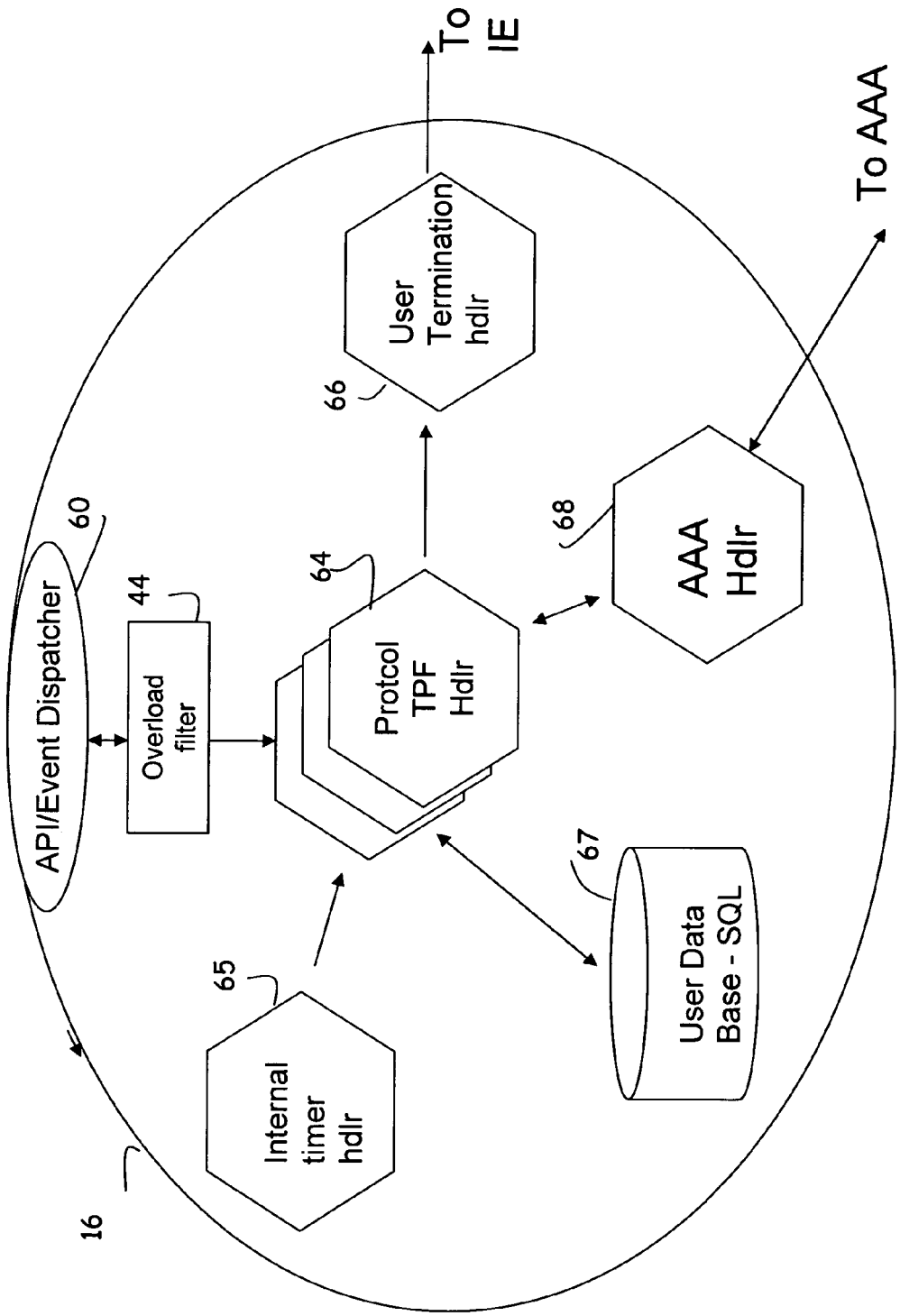
FIG. 2 is a block diagram of one embodiment of a networked system illustrating the aggregation and control of multiple session management components.

Referring now briefly to FIG. 2, an exemplary architecture of a session manager is shown. The session manager is shown to include an event dispatcher 60 which forwards events and commands to one or more object handlers. Advantageously disposed between the event dispatcher and the object handlers is an overload filter 44. As will be described in more detail below, the overload filter may be used to control the rate of connection requests, to ensure that the connection manager does not become overloaded.

According to one embodiment of the invention, protocols and transactions that are linked to the session manager are represented using a common framework or data structure, referred to herein as a Transaction Protocol Framework (TPF). The TPF is a data structure that identifies events that are of interest to the protocol or transaction, and also defines the response of the object to the event. Event handlers link the TPF object with client resources for processing the events. For example, a user termination hander 66 may link an object to a tunneling client for termination or further forwarding. An internal timer handler 66 may be used to link the TPF object to session life cycle management processes. An Authentication, Authorization and Accounting (AAA) handler 68 may be provided to link a TPF object to an AAA client. The TPF object is shown coupled to the User Data Base, and may include pointers to data structure of interest to the object (for example, user records, session records, etc.).

Representing protocol and transaction objects in a TPF format enables different services and protocols to share code that handles common events, thereby reducing redundancy of code and increasing the overall efficiency of the RAS. However, it should be noted that it is not a requirement of the invention that each transaction or protocol be represented in a TPF framework. Rather, as will be described in more detail below, the modular aspects of the present invention permit any protocol or transaction type to be integrated into the system by direct linking of a 'handler' which executes the service or protocol into the system.

Figure 3:
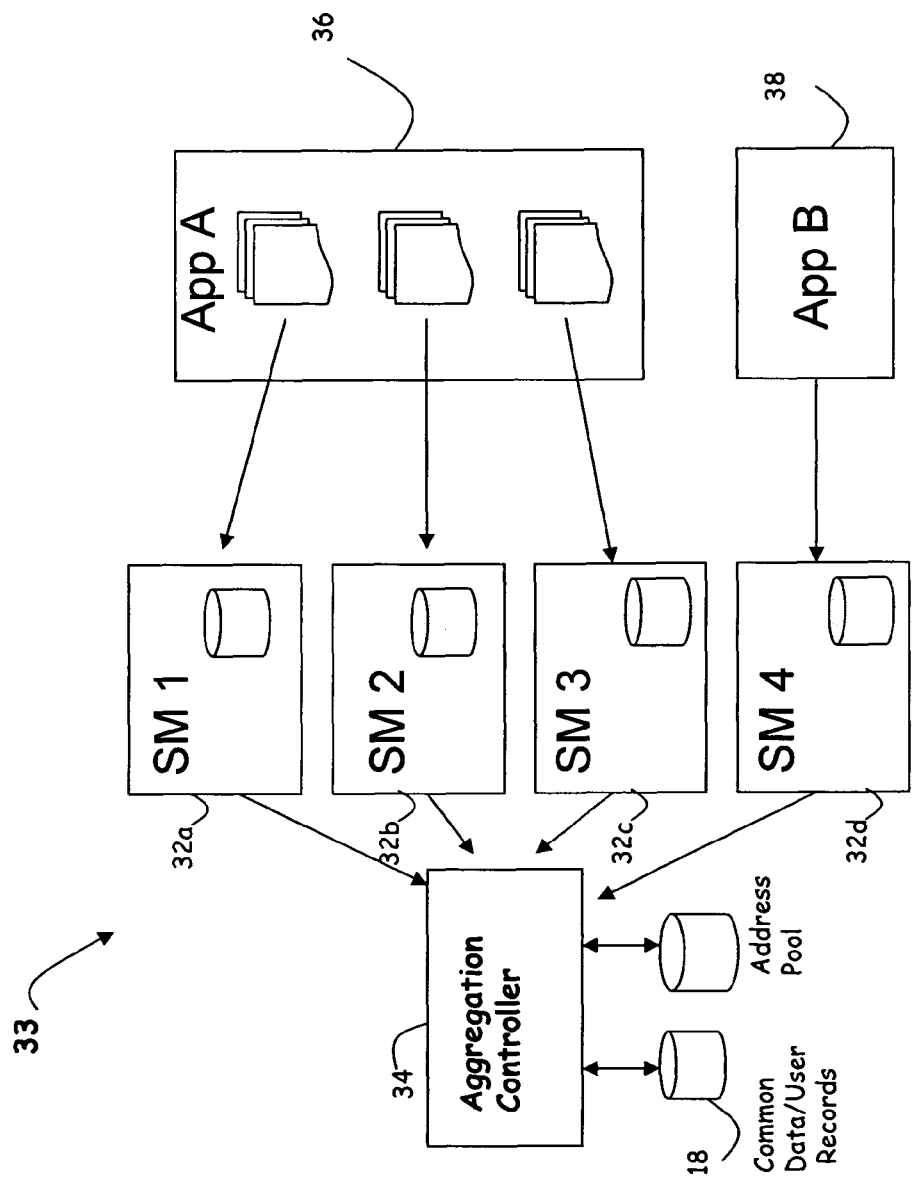
FIG. 3 illustrates an exemplary architecture of a session manager designed according to the concepts of the present invention.

Referring now to FIG. 3, according to one aspect of the invention, the RAS architecture may be easily scaled to support an increasing number of user sessions. As the number of sessions increase, additional session managers (32a-32d) may be provided by integrating session managers operating at different servers into the RAS. Communication between the session managers is provided by an aggregation controller 34. The session managers share a common data repository 18 and interface protocol suite. Because data for the sessions is stored in a common repository, load balancing among session managers can be easily controlled. In addition, the sharing of common interface protocol functionality and other standard processes ensures consistency in session management across the distributed connection system.

Multiple applications 36, 38 can distribute their session load among different SMs 32a-32d. Each SM can be dedicated to a single application (such as SM 32d and application 38), or alternatively, applications can run on multiple SM per processor each with different priorities. The Aggregation controller 34 controls the connection of the various SMs to each other and to other shared resources. In one embodiment, each SM registers with the aggregation controller 34, and is assigned in turn an address space, including, for example, a RADIUS port range. The Aggregation controller may additionally store information regarding which applications are associated with the individual SMs. Each SM has the same configured data from OAM, which is shared via common shared database 18. With such an arrangement, all services may be run from either one central area or via distributed servers, with applications and protocols integrating into servers via the aggregation engine protocols.

Figures 4A, 4B:
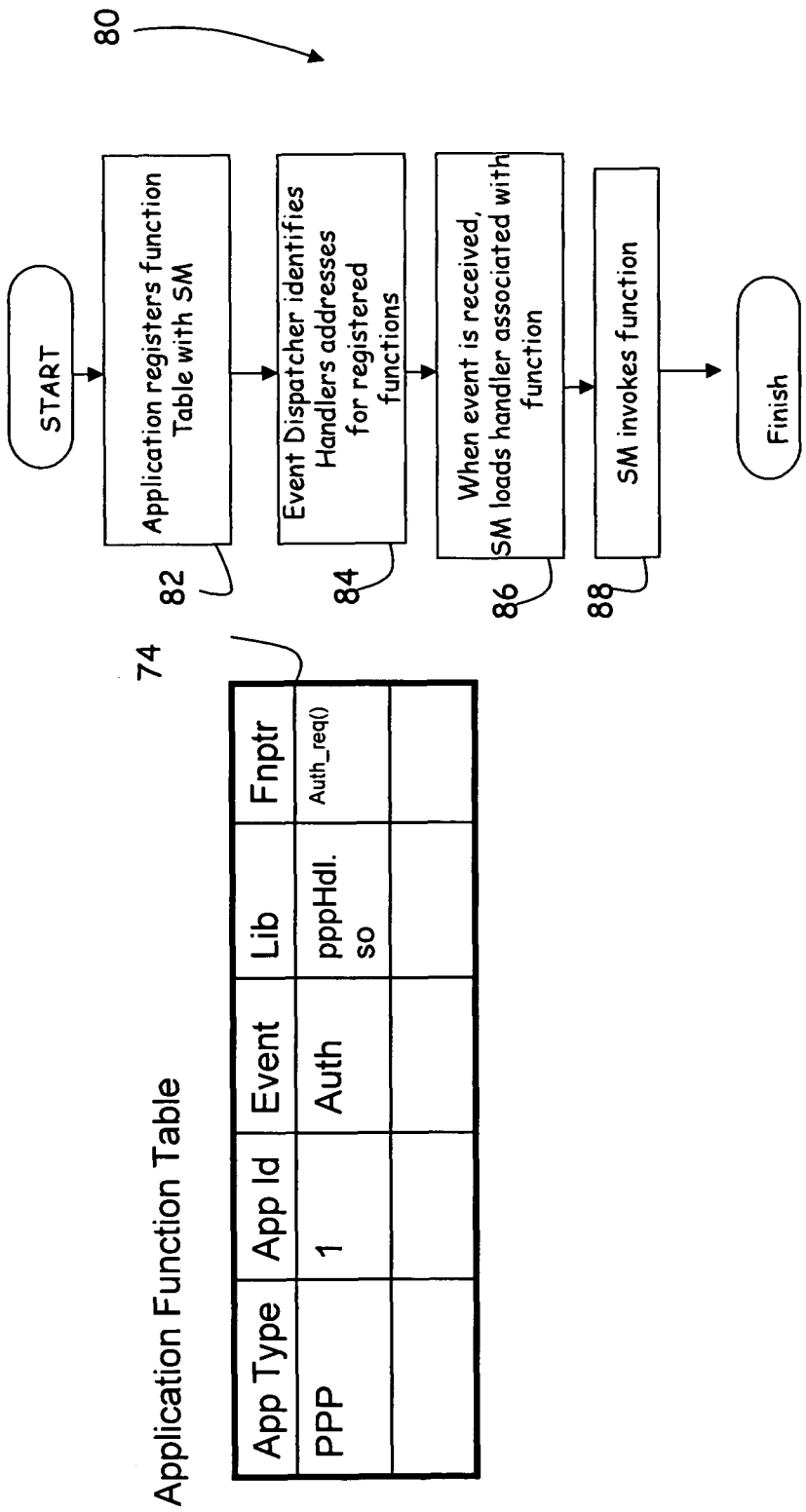
FIGS. 4A and 4B are a block diagram and flow diagram, respectfully, for use in illustrating the registration of an application with the session manager of FIG. 3.

An application, which may execute a service or protocol available to the RAS, is integrated into the RAS in the following manner. FIG. 4A is an exemplary application function table that represents which stores certain information associated with the application. The functional table includes information such as the application type (in this example a PPP protocol), and application instance identifier (in the illustrated case, this is the first instance of the PPP protocol that is integrated into the system), an application event trigger (in this example, the trigger associated with the application type is a PPP authorization event) and a library identifying code which is to be executed upon the triggering of the event. The function table also includes a pointer to a location in dynamic memory where the code associated with this instance of this application type is loaded.

FIG. 4B is a flow diagram 80 illustrating exemplary steps that may be performed in application registration. At step 82, an application to be connected to the RAS registers a function table with SM at startup. At step 84 the SM stores the function table in the event dispatcher. At step 86 the event dispatcher continually processes Mev messages (which identify that events have been triggered). When an App injects an event (e.g. Auth req), SM looks up the event in the app table, loads the handler into dynamic memory (if not already loaded), and stores the dynamic memory handler address in the fnPtr. At step 88, the SM will then invoke the function pointed to by the fnPtr to process the event.

With this arrangement, the application has access to the application code and the handler functions. As mentioned above, application functionality may be provided in TPF library format, or alternatively may be code which is directly linked into the SM. For those applications represented in TPF format, a standard set of events may be included in a TPF object; those applications that have no interest in the event simply insert a null function if event not supported. Although only one event is shown in the application table 74 of FIG. 4A, it may be that numerous events associated with the application would be registered in the application function table.

Figure 5:
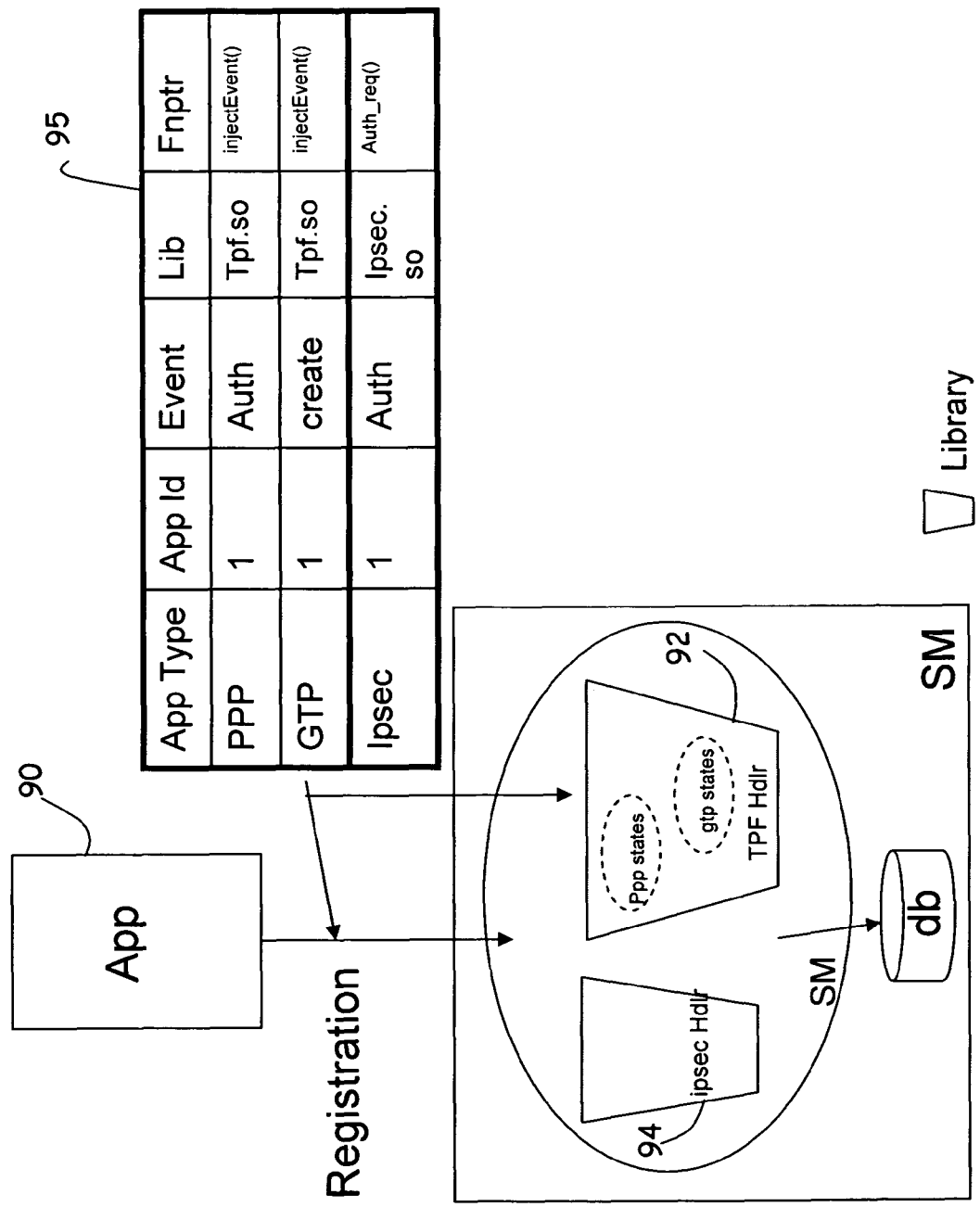
FIG. 5, exemplary application function table for a given service set is described.

For example, referring now to FIG. 5, an application function table 95 defines the set of handler's associated different applications 90. Some of the functionality is represented according to the TPF framework, and some of the functionality is independent code linked to the application. Thus, the PPP and GTP objects are shown as standard library objects represented in dynamic memory as TPF handler type objects 93. Certain triggers are associated with each application, and the handlers for the triggers are stored in dynamic memory, with pointers to the handlers being stored in the application table as described in FIGS. 4A and 4B. Note that in this example, both the PPP and GTP applications are TPF applications, retrieved from a standard library of TPF handlers 93. The handler instances are stored in dynamic memory, and their pointers are inserted into the application function table 95. As mentioned above, other functionality which is not represented in TPF library format may also be linked into the SM. Thus, in FIG. 5, when the IPsec application registers with the SM, a pointer to the IPsec handler code is retrieved from library 94, stored at a location in dynamic memory, and the pointer to that location is inserted in the application table.

Figure 6:
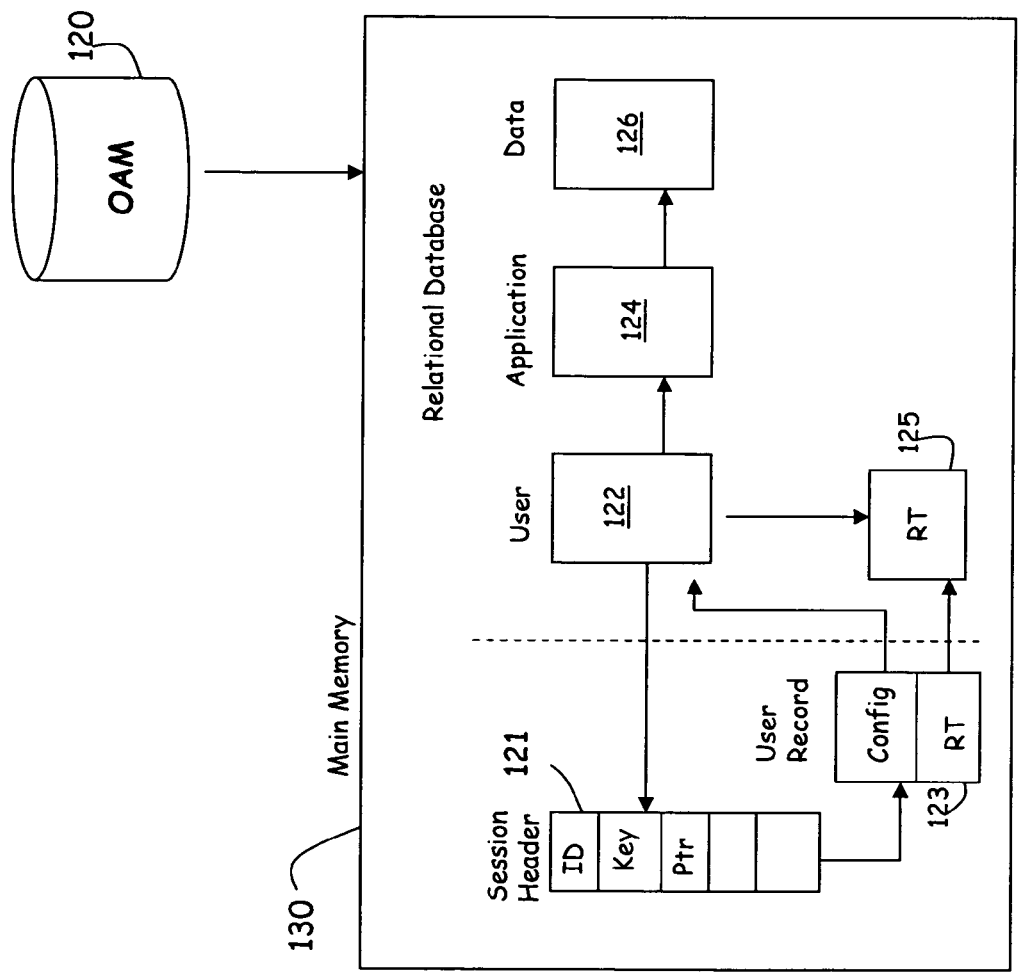
FIG. 6 is a block diagram provided for purposes of illustrating record management during session initialization.

Referring now to FIG. 6, a brief discussion of memory management of objects during initialization will now be described. As is seen from the above discussion, a standard set of libraries of TPF functionality is stored in a non-volatile memory. In addition, as new functionality is added, the code supporting that functionality is added to the non-volatile store. In general, the existing library of functionality is stored in persistent memory in the OAM 120. Dynamic memory 130 is used in general to store configuration and run time data. According to one embodiment of the invention, the dynamic memory is apportioned into two sections, one of which performs general data structure storage, and the other section which represents the relational aspect of the configuration data using Structured Query Language (SQL). SQL is a specialized programming language for sending queries to databases. Most industrial-strength and many smaller database applications can be addressed using SQL. Each specific application will have its own version of SQL implementing features unique to that application, but all SQL-capable databases support a common subset of SQL.

At session initialization, a session header 121 is built. The session header 121 includes basic information associated with the session, including an identifier, any keys associated with securing communication in the session, and a number of pointers to user records, applications and protocols that are used in the session. Each user record includes configuration and run time data 123, indicating how the user is to interface with any of the applications. The session is then 'built' by extracting the user configuration data and generating a relational SQL database which couples the user to authorized applications and data items, as well as defines various properties of the user, including tunneling properties, etc.

Once the session is established, and the connectivity operation is completed, any run-time data 123 retrieved during session establishment is to the SQL database 125, and the originating session information is destroyed. The SQL database thus not only optimizes configuration of the session, but also allows post processing of the session and collection of run time data once the session is completed and connectivity is established.

Figure 7:
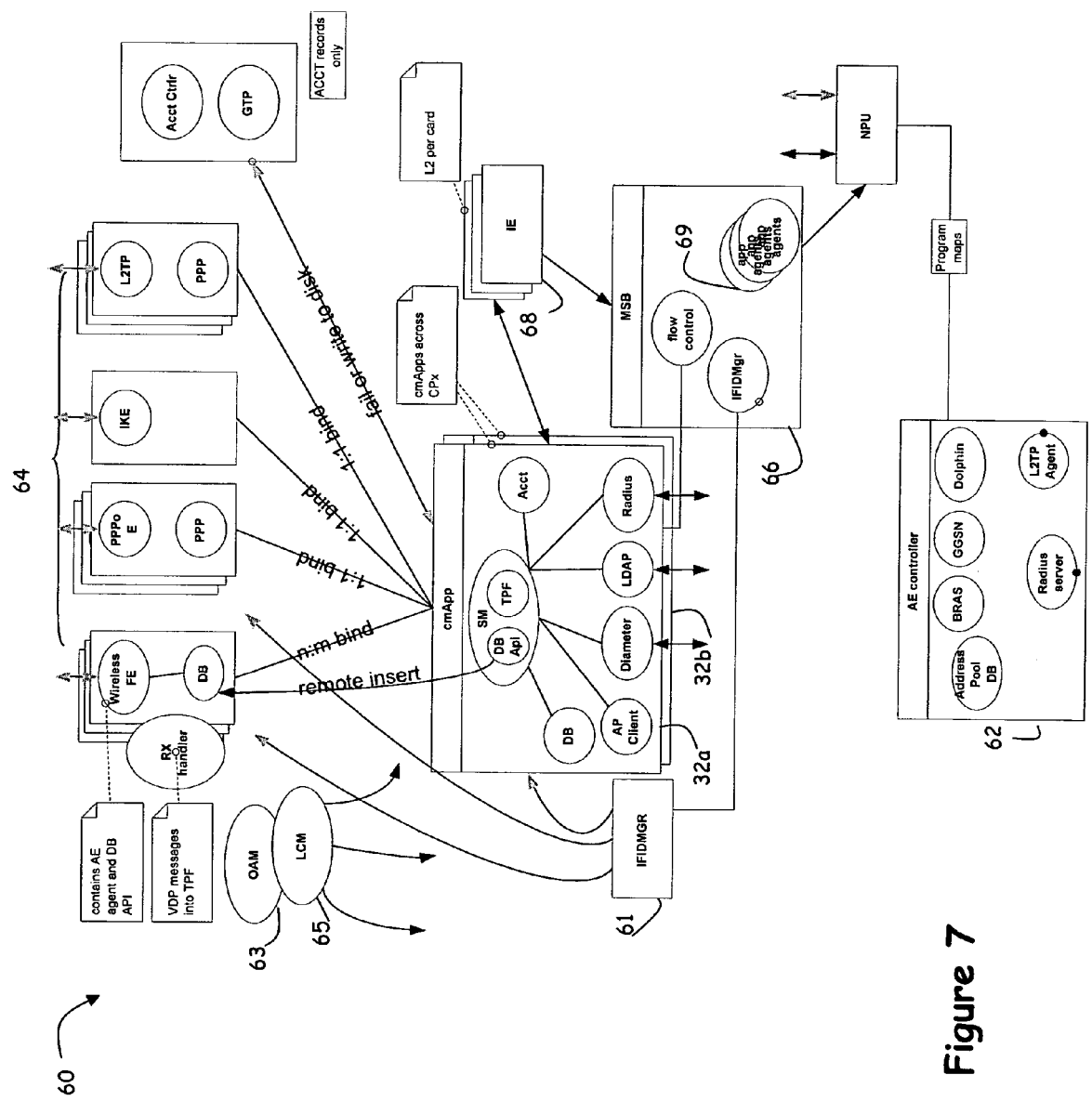
FIG. 7 is a block diagram of another embodiment of a scalable networked system which uses modular components to provide connection control and session management.

An exemplary embodiment of a service oriented system which uses the architecture of the present invention is illustrated in FIG. 7. As described with regard to FIG. 3, multiple SMs 32a and 32b manage accesses by different types of user devices to shared resources. Each SM becomes coupled to one or more Interface Engines 68, which control data flow interfaces between the various modules and memory (not shown). FIG. 7 illustrates that various protocols modules may be integrated into the RAS, including Wireless interfaces, PPP, IKE, L2TP, etc. In one embodiment, the user interfaces are assigned identifiers, and references to the interfaces are controlled by the interface ID manager 61. The applications and resources are object oriented, and may include accounting applications, flow control and other protocol application support.

As stated above, each Session Manager (such as 32a) may be coupled to set of objects related to various service functions available to users of the session. The service objects may include, for example, Accounting, Radius, LDAP, Data Base management, etc. although other objects may be provided, and the choice is design dependent. The objects represent the underlying functionality of service. Physical coupling of the object representing the service and the underlying hardware providing the service is controlled by the Aggregation Engine Controller 62.

FIG. 7 thus represents one embodiment of a connection management system which may be built using the concepts of the present invention. Abstracting the functionality of the services from the underlying applications, and modularizing the functionality thus enables a scalable system which readily supports the addition and deletion of sessions, services and protocols. A more detailed description of the session manager, and how it operates to control the interfaces between the various modules, will now be described in detail.

Figure 8:
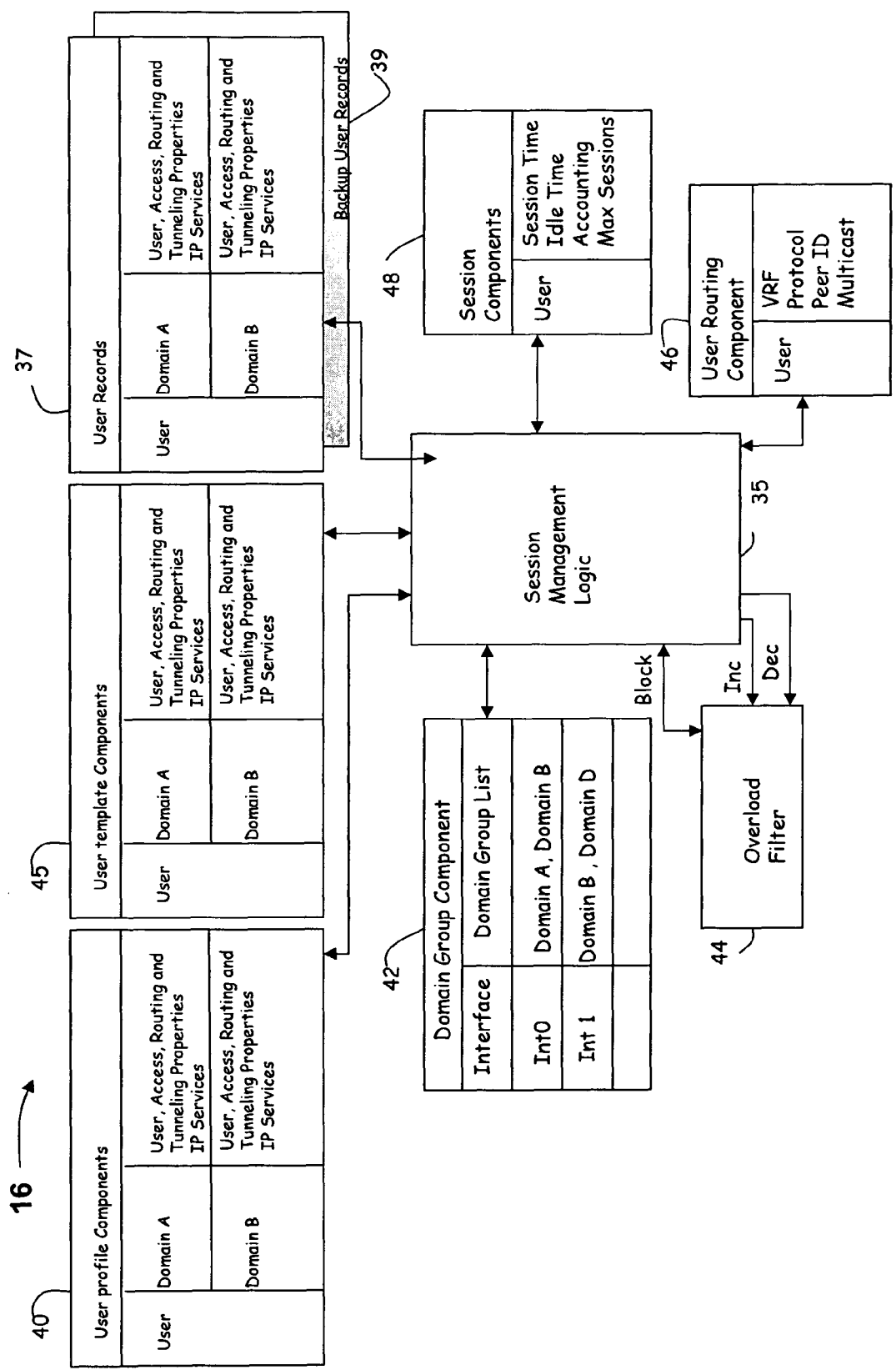
FIG. 8 is a block diagram illustrating several data structures and functional components that may be included in session management functionality of the device of FIG. 1.

Referring now to FIG. 8, several records which may be accessed by the session management object 12 will now be described in more detail. The records include a domain group component 42, a user profile component 40, a session options component 48, a routing options component 46 and a template component 45.

One domain group component 42 is provided for each interface. The domain group component 42 stores a list of valid domains for the interface. The domain group component may be referenced by a domain limiting service object that is used for authentication, allowing only certain domains to connect on pre-defined interfaces.

As mentioned above with regard to FIG. 6, the CM controls the generation of a user record for each connection made by a user. User records are stored in the user record store 37 in the SQL database. Each user record is generated either from a user profile 40 or through the use of a user template 45. The user profile component includes, for each user, a number of statically provisioned user attributes. When the user seeks to establish a connection with the device, the contents of the user profile are copied to an active user record object and stored in user records 37. The user template component also stores a number of user attributes. User records may be auto-generated from the user template based on wildcard matches with a selected portion of the connection source identifier. Thus, in an example where the connection source identifier includes a user identifier and a domain name, the CM can be programmed to use the same user template for any given user identifier, regardless of the domain (for example, user@*.*).

The user profile object, user template object and user record object each store data regarding the attributes of the user connection. In particular, the contents of these records direct the logic for brining up the user and applying IP services to the user. Exemplary attributes that may be associated with a user connection include access properties, user properties, routing properties, tunnel properties, and IP services, although the present invention is not limited to the provision of any particular attributes in the user record.

Access properties may be used to identify the methods of authentication, authorization and/or accounting that is to be associated with the connection. For example, the access property may describe the use of RADIUS services or an alternative method of IP address generation (such as DHCP or address pools). The user properties may include information regarding the particular user such as the username, password, Host IP address, Host IP mask and Peer IP address. An Interface Identifier (IFID) may also be stored in the user record. According to one aspect of the invention, the IFID may also be stored in the user record for the user. As will be described in more detail later herein, the IFID may assist in tracing the user through the various connections of the device.

The routing property attribute of the user record may identify a particular routing protocol object that is to be invoked for further forwarding of transmissions from the user connection. The routing property may include a pointer to a corresponding routing component, such as routing component object 46. Each routing component object stores a variety of routing protocol attributes, including a Virtual Route Forwarding (VRF) information, Protocol identifiers, a Peer identifier (for use in peer protocols) and a multicast indicator. If the routing property indicates that a user is configured for a Virtual Private Network (VPN) the IP address of the user is applied to the VRF of the VPN. Other attributes associated with a routing protocol may also be stored in a routing protocol object and the present invention is not limited only to those attributes recited herein.

The tunneling property identified in the user record 37 indicates whether the connection is terminated at the device or further tunneled. In one embodiment the tunneling indication is made by provision of a tunnel name in the appropriate field of the user record. The user record also indicates any Internet Protocol (IP) traffic management service which is to be applied to the connection. In one embodiment, each IP TM service is represented by an object, and is linked to a particular connection by including the IP TM service object identifier in the user record associated with the connection.

In one embodiment of the invention, user records are shadowed by periodically storing and updating a copy of the user records in a non-volatile device, such as a hard drive disk. In the event that the user records are corrupted or the device experiences an intermittent failure, the user records can be quickly restored from the copy in the hard drive. Quick restoration of user records enables carrier grade performance to be maintained by reducing the probability that a single point of failure will cause user connections to be disrupted.

Also shown in FIG. 8 is a session component/object 48. Session component/objects are used to describe the control of user sessions at a given interface. Various attributes of the session object include a session time, indicating a maximum time for the session to stay up, an idle time, indicating a maximum time that the session can be idle before it is torn down, an accounting field, indicating whether accounting state is saved for the session, and a maximum session indicator of the maximum number of sessions permitted for a given user name. In one embodiment a session object is associated with each interface (IF). The attributes for each session object for each interface are defined by the OAM during registration of the access protocols at the interface.

Congestion Avoidance

In one embodiment of the invention, an overload filter 44 is provided to prevent the CM from becoming overloaded with connection requests. In one embodiment, the CM maintains a credit value. As a connection request is received at the CM, the credit value is decremented. When the user connection has been established, the credit value is incremented. If the number of outstanding connection requests causes the credit value to decrease to a predetermined value (i.e., zero), the overload filter issues a block to the CM, causing further connection requests to be denied until sufficient outstanding connection requests have been serviced.

In the above description one credit value is incremented or decremented for all types of access protocol requests. However it is envisioned that different credit values may be provided and associated with different types of access protocol requests. In such an embodiment, it may occur that access requests corresponding to one protocol (L2TP) are blocked while access requests corresponding to a different protocol (PPP) are allowed to proceed for service. Various other methods of associating credits with connection requests (i.e., by domains or interfaces) may be substituted herein without affecting the scope of the invention.

Figure 9:
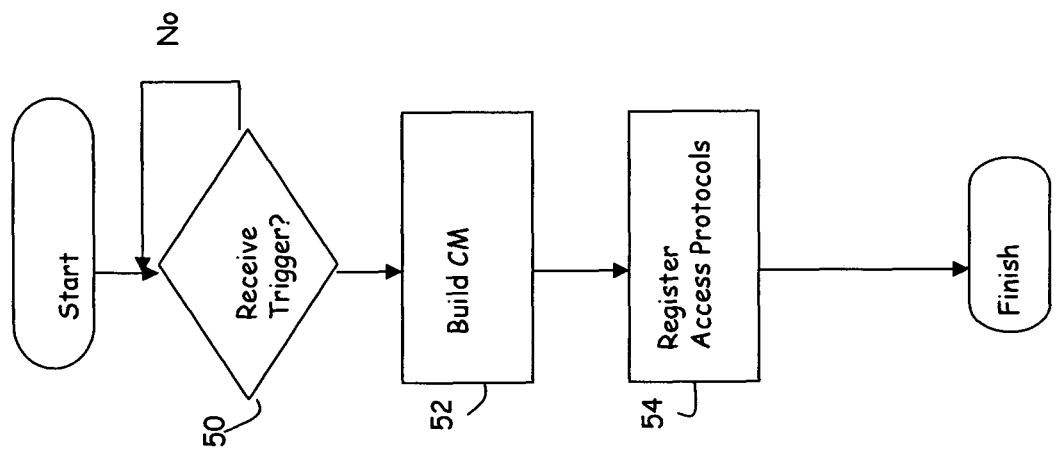
FIG. 9 is a flow diagram illustrating several exemplary steps that may be taken for initializing a connection management object for controlling user connections to resources using the concepts of the present invention.

Referring now to FIG. 9, a flow diagram will now be described which illustrates one process for initializing the CM. At steps 50 and 52 the CM is built as a Linux process executing at the device. The trigger which initiates the CM build at step 50 is the configuration by the OAM of RADIUS profiles, access profiles, DHCP objects or user records/templates. When CM is initialized at step 52, the following objects may be selected for creation: Session Manager object 16, AAA object 14, RADIUS object 26, DHCP object 28 and Accounting object 30. The CM object advantageously resides on the same server with the access protocols (PPP, L2TP, etc.). Access protocols that are to be bound to CM will register with CM at step 54, using the process described with regard to FIGS. 4a and 4b. Access protocols are only started when configured, however PPP by default is started when CM is started and binds to CM. CM stores the object address of all access protocols.

Figure 10:
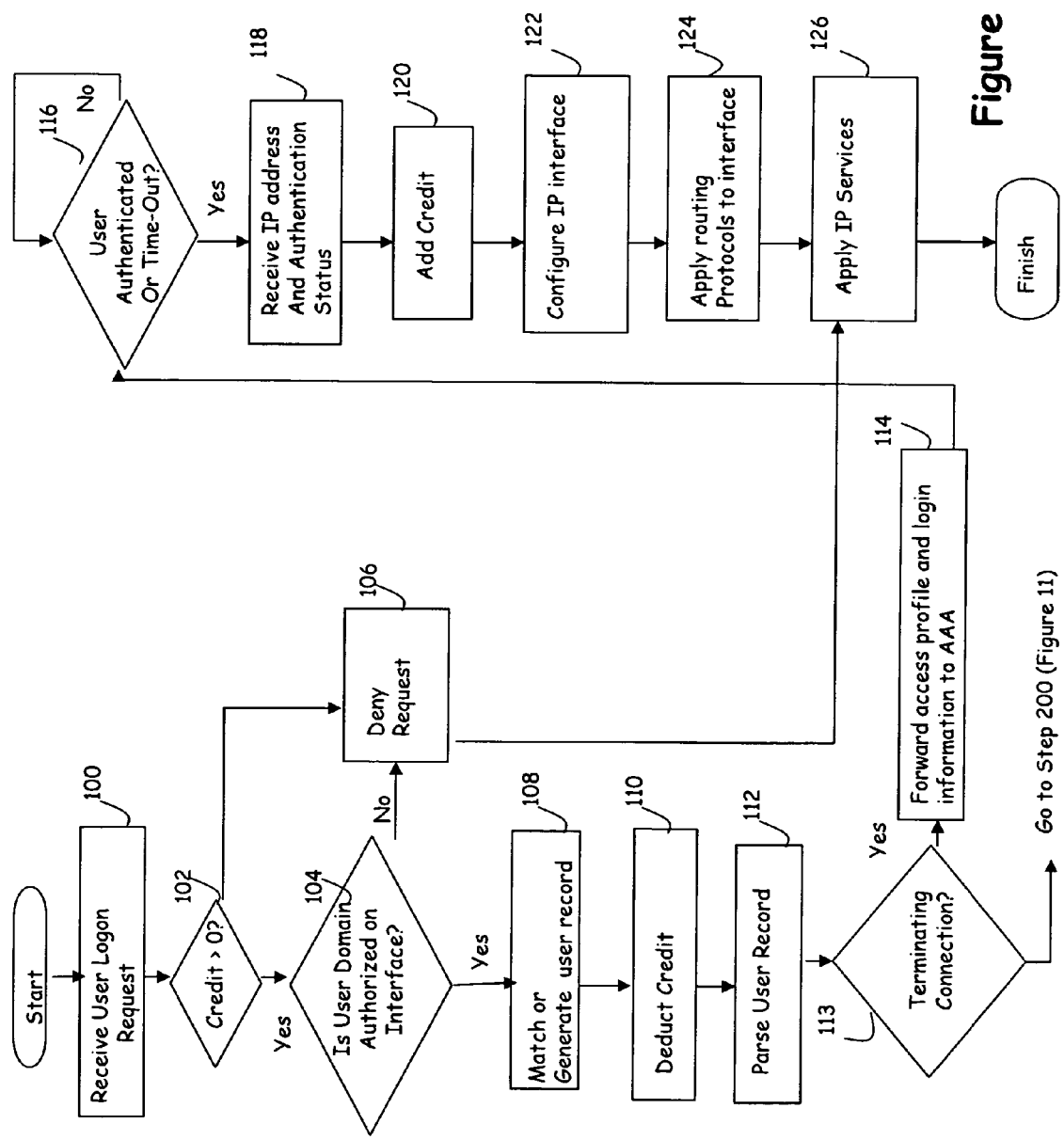
FIG. 10 is a flow diagram illustrating several exemplary steps that may be taken when establishing user connections according to the present invention.

Once the base service set of the CM has been established, the CM may begin the process of building user connections. Referring now to FIG. 10, several exemplary steps that may be performed to establish a user connection using the architecture of the present invention will now be described. At step 100, when a user logs in via PPP, authentication information including a user identifier and domain name is passed to session management logic 35. If it is determined by the congestion controller 44 at step 102 that the credit value is less than a predetermined number (e.g. zero), then at step 106 the request is denied. Otherwise, at step 104 the session management logic 35 may use domain limiting authorization techniques to authenticate the connection by verifying the received domain against the domain list for that interface, as defined in the domain group component 42. If it is determined at step 104 that the received domain does not match the allowable domains for the interface then the connection request is denied at step 106. Otherwise, at step 108 the connection request is mapped to a user record based on username and domain, either using the user profile component 40 or the user template component 45 as described above.

Once the user record is generated, at step 110 the session manager deducts a credit from the credit value and at step 112 parses the record. The record is parsed to identify access properties, user properties, routing properties, tunnel properties and IP services. At step 113, it is determined whether or not the user connection is terminated at the device, or tunneled to another endpoint.

At step 114, for users who are not to be tunneled, the access profile name and the login information is passed to the AAA object 14, and the user is authenticated using the selected authentication service for the connection. If at step 116 it is determined that authentication has succeeded, at step 118 the session management logic is forwarded the users IP address and authentication status. When the authentication information is received at the session management logic 35, at step 120 the session management logic adds a credit to the credit value, and at step 122 forwards a configuration message to create an IP interface on the IE where the PPP session exists. In the case where the user is a part of a VPN (described in routing properties) then the IP address is applied to the appropriate VRF by IE. At step 124, the session manager requests the routing system to apply any routing protocols to the generated interface if routing is enabled. Once the IP interface is configured, at step 126 the IP services are applied to the interface for any traffic management services indicated in the user record. Each user can be allowed a unique set of services, depending upon the specification indicated in their associated user record.

Figure 11:
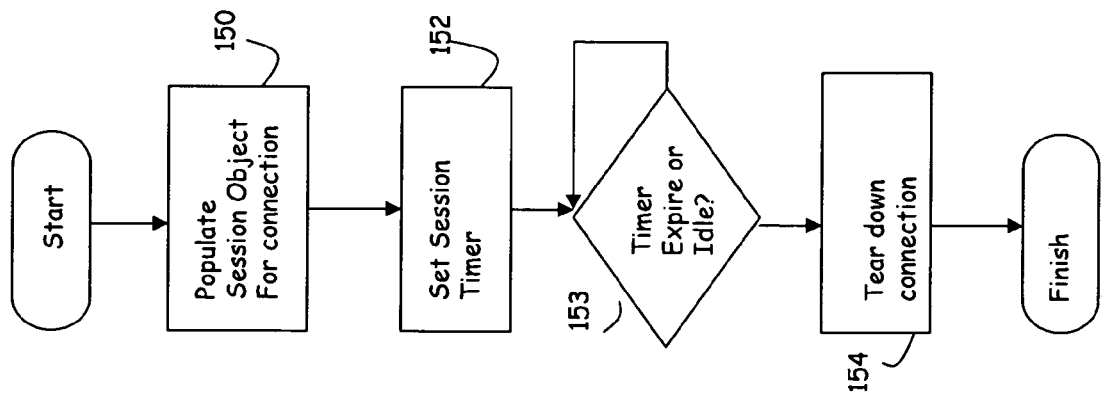
FIG. 11 is a flow diagram illustrating a process for session management that may be used in the present invention.

Terminated users can be configured with session time limits and idle time limits. Referring now to FIG. 11, a flow diagram illustrating the control of a user session by the session management logic 35 will now be described. Thus, at step 150 the session management logic generates uses the session component 48 for the interface to generate a session object for the user. At step 152 the session management logic 35 starts a timer for each user that is configured with a session timeout. When it is determined at step 153 that the session has expired or become Idle, the session management logic initiates the session teardown via PPP.

Figure 12:
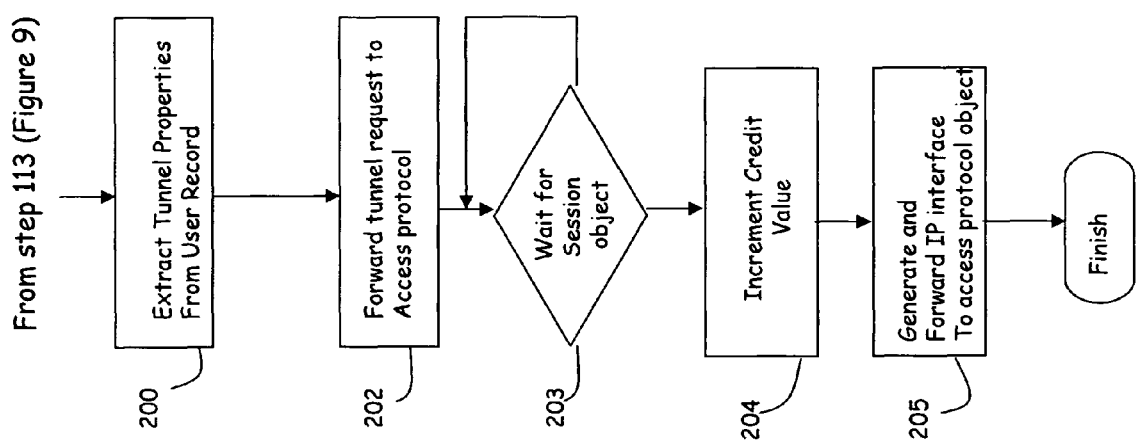
FIG. 12 is a flow diagram provided to illustrate the control of tunneled connections at the device of the present invention.

Referring now to FIG. 12, if it was determined at step 113 (FIG. 10) that the user connection does not terminate at the device, then the connection is subject to tunneling. At step 200, the tunneled user connection properties are retrieved from the user record, and the tunneling service is handled according to the indicated tunneling attributes. For example, for L2TP tunneled connections, the connection will not terminate or authenticate locally. Rather, at step 202 the session manager forwards a tunnel request for the user to the L2TP component 23 (FIG. 1), and waits to be provided with a new session component at step 203. When the new session component is provided, at step 204 the session manager adds a credit to the credit value and at step 205 forwards an IP interface to the PPP.

Figure 13:
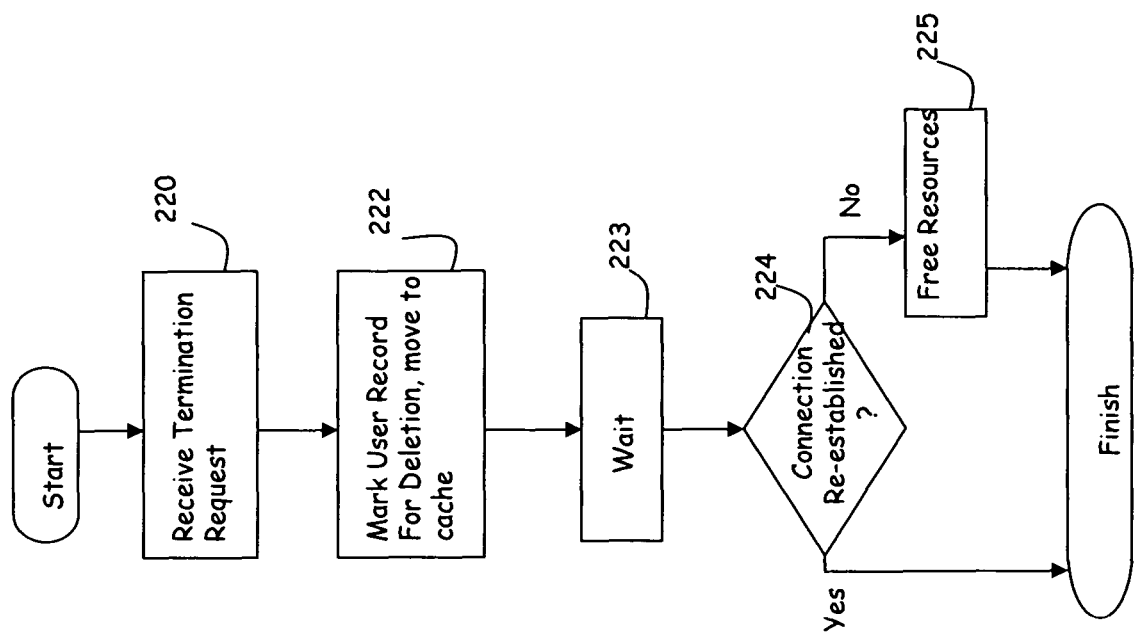
FIG. 13 is a flow diagram provided for illustrating exemplary steps that may be taken for terminating user connections at a device architected according to the present invention.

Referring now to FIG. 13, a flow diagram of some exemplary steps that may be taken for terminating a user connection at the CM will now be described. At step 220, the session manager is notified of the termination request from PPP (or the request is self generated from Idle, session time out or other means). At step 222, when a user terminates the record is marked for deletion and cached. The user record is cached for predetermined interval of time then deleted if the user connection is not re-established in that time period. Thus at step 223, a wait period is entered, and at step 224 the session manager determines whether the user connection has been re-established by comparing the cached user record against the existing user records. If the connection is not re-established, then at step 225 the user record is deleted. When the user record is deleted, all resources occupied by the user will be freed, including Ip addresses and tunnel sessions. The session management logic notifies the appropriate application to terminate the user resources. For example, the protocol module is instructed to release the IP interface and the L2TP object is instructed to terminate the session. In addition, all routing configurations are removed.

The pre-determined time period is a matter of design choice, and will vary depending upon the user connection environment, resources available at the device and applications that are being accessed. The time period may be variable, depending upon changing resource capabilities of the system, or alternatively may be a fixed number for ease of implementation. The present invention is not limited to any particular time period with regard to the storage of terminated connection state.

Figure 14:
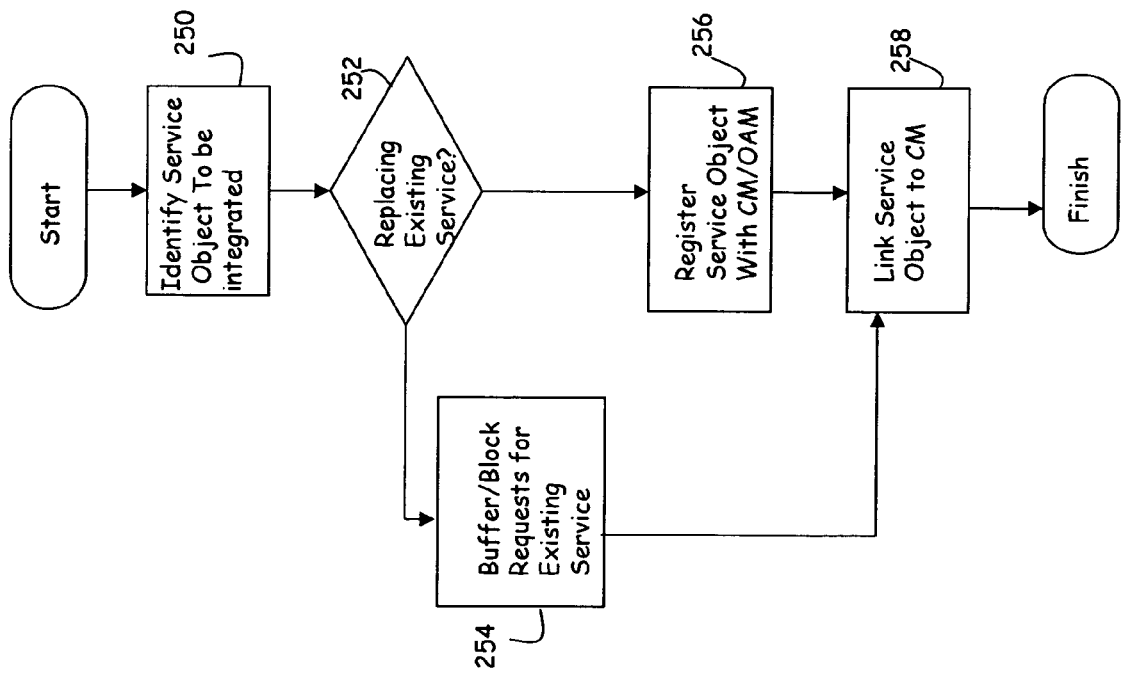
FIG. 14 is a flow diagram illustrating exemplary steps that may be taken to integrate service objects into a connection manager of the present invention without disrupting existing user connections.

Referring now to FIG. 14, a flow diagram is provided for illustrating the integration of a service object into a CM which has already been initialized and is managing user connections. The service object may be a service object associated with a new application that is being integrated into the system, a new access protocol that is to be used for connections, or alternatively may be a spare version of an existing service which is experiencing faults or other types of intermittent failures.

At step 250, the service object that is to be linked into the CM is identified, either by the OAM in response to a request for the protocol, service or functionality by the user or alternatively by the OAM upon an indication of a fault in one of the existing service objects. At step 252, it is determined whether the service object replaces and existing object (fault or other upgrade), or alternatively whether it is a new object. If the service object replaces an existing object, then at step 254 requests to the existing service object need to be blocked while the upgraded object is linked into the system. Blocking requests to the service can be achieved by either denying the requests or by buffering the requests for later handling by the upgraded service. If the service is a new service to be added, then at step 256 the service object is registered with the OAM/CM. At step 258, the service object is linked to the CM process, and requests for the object are processed.

FIG. 14 thus illustrates how the modular nature of the connection management architecture facilitates the addition of service objects. Objects may also easily be deleted from the CM function set by removing the links between the object and the CM process to free up any resources.

Figure 15:
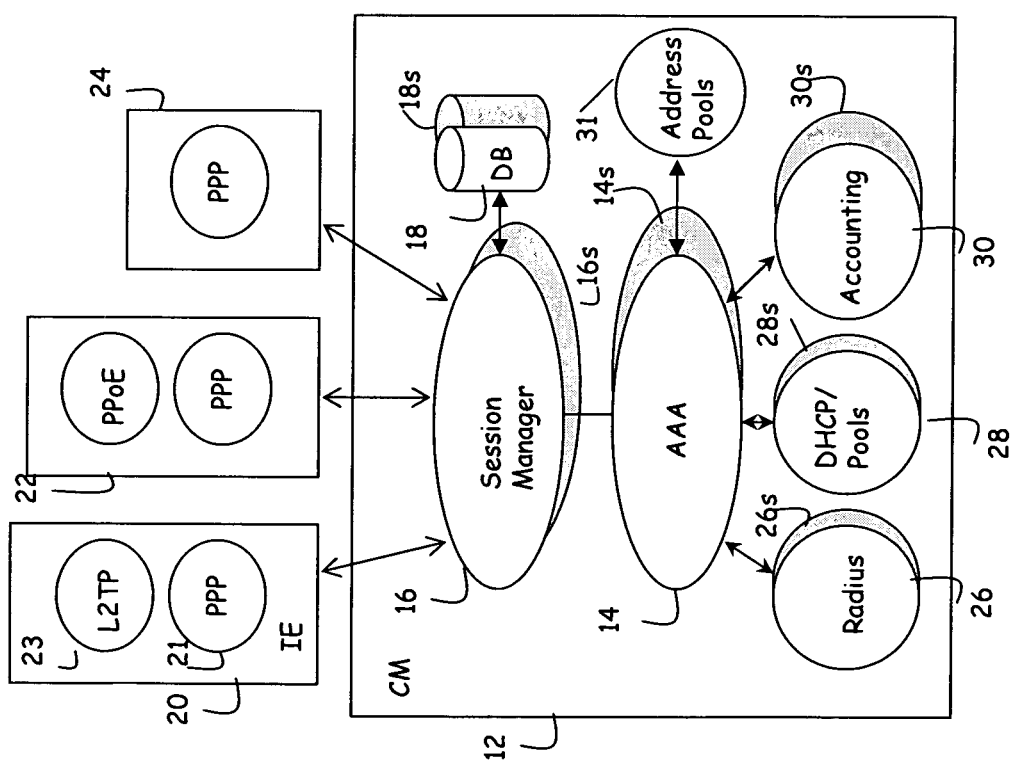
FIG. 15 is a block diagram provided to illustrate a carrier grade connection management system according to the present invention including several 'spare' service objects.

Referring now to FIG. 15, a block diagram of a carrier-grade embodiment of the connection management architecture is shown to include a number of shadow modules provided for each functional object generated in the connection manager. The shadow modules are objects that are instantiated as the same point in time that the original modules are constructed. Following construction of the shadow modules, they are stored in a non-volatile memory, and retrieved as need to replace faulty service objects using the procedures described in FIG. 10. Thus, session manager 16s is the shadow copy of the session manager 16, AAA 14s is the shadow module of the AAA 14, etc. In FIG. 15, each functional module is shown as having a shadowed (or spare) copy associated therewith although this is not a requirement of the present invention. Rather, the decision as to which modules should be 'spared' may be made by weighing the typical performance of the modules against the available resources in the device and the quality of service that is sought to be provided. In addition, although for clarity purposes the spare copy is shown physically next to the original copy, it is appreciated that the underlying goal is to separate the copies to prevent the spare from being corrupted by the same factors that affect the original copy of the module.

Accordingly a method and apparatus for controlling user connections at a device has been shown and described. The method includes means for apportioning the functional capabilities of the device into discrete components which may be represented as objects and linked into the operating system of the device on an as needed basis, thereby enabling 'plug and play' service upgrades. Application modules may either be provided via a standard TPF library, or alternatively may be integrated into the system as a code. User records control the interfaces of the service objects, thereby ensuring that the appropriate services are provided to a given connection. New or redundant copies of service components and user records may easily be swapped into the system without rebooting; thereby ensuring that user connections are not disrupted and carrier grade performance can be achieved.

The connection system can be easily scaled by adding additional session managers to the system. In such a system, the additional session managers all share a common repository of data and service objects. Communication between the session managers and the shared resources is controlled by an aggregation controller.

In addition a congestion control mechanism at the device helps to ensure that resources are not overwhelmed by accesses from large numbers of users operating under different protocols.

The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

FIGS. 9-13 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using base band signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

What is claimed is:

1. A method for controlling connections at a remote access device comprising:
    associating a plurality of services of a service set available at the remote access device with a plurality of corresponding service objects;
    instantiating the plurality of corresponding service objects;
    instantiating, for at least one service object of the plurality of corresponding service objects, a spare service object;
    maintaining, by the at least one service object, a plurality of user records comprising a current state of user connections at the remote access device;
    receiving a first request from a user device for the at least one service object;
    determining that the at least one service object has failed;
    in response to determining that the at least one service object has failed, buffering the first request:
    invoking the spare service object;
    reading, by the spare service object, the plurality of user records over a period of time;
    receiving a second request from a second user device for the at least one service object the period of time;
    buffering the second request; and
    after the spare service object has read the plurality of user records, processing, by the spare service object, the first request and the second request.

2. The method of claim 1 further including:
    generating an Internet Protocol (IP) interface for each user connection authenticated at the remote access device;
    associating each IP interface with at least one permitted domain; and
    discarding user connection requests received at a given IP interface from user domains that are not associated with the given IP interface.

3. The method of claim 2 further including integrating a new service object into the plurality of corresponding service objects without disrupting user connections to the remote access device.

4. The method of claim 3 wherein the new service object is associated with a function to be added to the remote access device.

5. The method of claim 1 further including limiting a number of outstanding user connection requests at the remote access device.

* * * * *